No. 713,599. Patented Nov. 18, 1902.
T. C. BUDER.
TROLLEY POLE.
(Application filed Apr. 4, 1902.)
(No Model.)
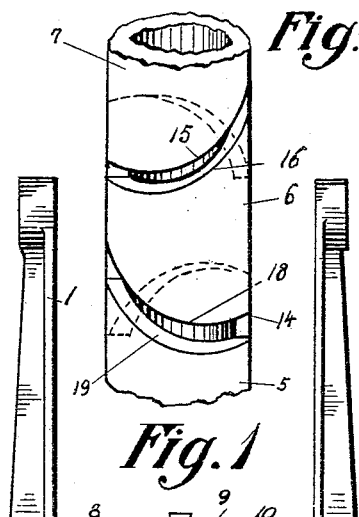
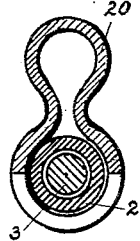
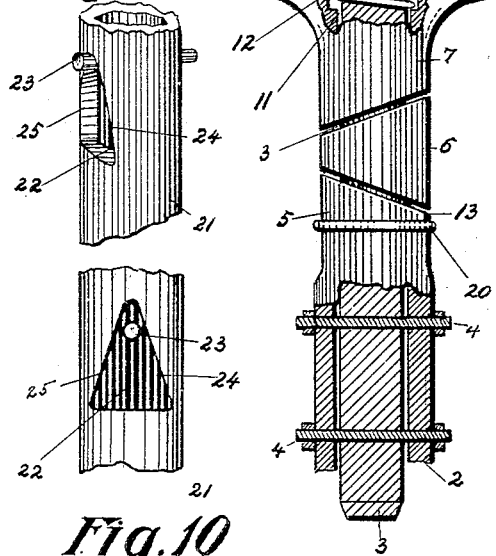
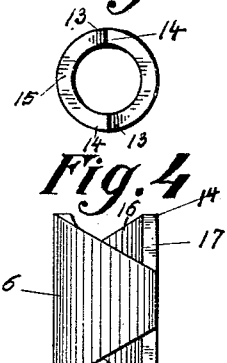
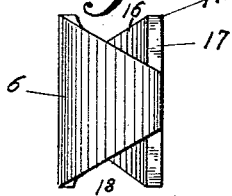
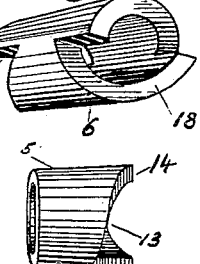
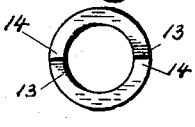
WITNESSES:
Carl Raupp
Maud E. Letcher
INVENTOR:
Theodore C. Buder
BY
Hugh K. Wagner
His ATTORNEY.
THE NORRIS PETERS CO., PHOTO-LITHO., WASHINGTON, D. C.

UNITED STATES PATENT OFFICE.

THEODORE C. BUDER, OF ST. LOUIS, MISSOURI.

TROLLEY-POLE.

SPECIFICATION forming part of Letters Patent No. 713,599, dated November 18, 1902.

Application filed April 4, 1902. Serial No. 101,340. (No model.)

*To all whom it may concern:*

Be it known that I, THEODORE C. BUDER, a citizen of the United States, residing at the city of St. Louis, State of Missouri, have invented certain new and useful Improvements in Trolley-Poles, of which the following is a full, clear, and exact specification, such as will enable others skilled in the art to which it appertains to make and use the same.

This invention relates to new and useful improvements in the means of making a trolley adjustable to the curves in a trolley-wire, and has for its object to prevent the displacement of the trolley from the wire, which with existing constructions is a very common occurrence. The means for preventing such displacement in my present invention are located adjacent to the trolley head or fork and form, in some sense, a prolongation or extension of the trolley-pole proper.

In the drawings, Figure 1 is a front elevation. Fig. 2 is a side view. Fig. 3 is a bottom plan view of the tubular portion of the trolley-head. Fig. 4 is a side elevation of the movable member 6. Fig. 5 is a perspective view of the same. Fig. 6 is a perspective view of the tubular and cut end portion of the trolley-pole proper, taken out of connection with the pole, of which it forms an integral part. Fig. 7 is a top plan view of the tubular end portion of the trolley-pole proper. Fig. 8 is a detail of a ring around the upper portion of the trolley-pole proper for holding the trolley-rope. Fig. 9 is a perspective view of a modification of my principal invention, and Fig. 10 is a side elevation of the same.

1 indicates the trolley-fork, which may be of any desired form or construction.

2 is the upper end of the trolley-pole proper.

3 is a rod which is rigidly attached inside a tubular end portion of the trolley-pole proper by the bolts or pins 4. Said rod runs through the parts 5 6 7 and through the base or bridge portion 8 of the trolley-fork and has at its uppermost end a threaded portion on which the nut 9 is screwed down to the shoulder 10 on the rod 3. Another shoulder 11 is formed inside the tubular portion 7 of the trolley-head, and a spring 12 is located between said shoulder 11 and the nut 9. The amount of space between said shoulder 11 and the nut 9 is governed by the amount of play which it is deemed desirable to give to the movable parts, it being the intention that said spring 12 shall act as a guard or auxiliary means of returning the parts to their normal position when the curve in the wire has been passed, should same be found necessary.

The upper tubular portion of the trolley-pole proper 2 terminates in a portion having two right-hand wedge-shaped cuts in its periphery, the beginning of one of said cuts and the ending of the other being coincident, and the lowest part of one of said cuts being the lowest portion of a straight wall rising to the highest portion of the other cut. The place of beginning of both cuts are diametrically opposite each other and also the places of ending. The lowest portion of said cuts is indicated by the reference-letter 13 and the highest by 14.

The lower part of the tubular portion 7 of the trolley-head is cut in a similar but opposite manner, the wedge-shaped cuts on said portion being left-hand cuts, but otherwise conforming in shape identically with those on the tubular portion of the trolley-pole proper just described, both of the tubular portions to which I have just referred encircling the rod 3. Also encircling said rod and located between the tubular portion 7 of the trolley-head and the tubular portion 2 of the trolley-pole proper is a movable member 6, which has wedge-shaped cuts on its upper and its lower ends or sides, which interlock, respectively, with the cut portions of the trolley-head and the trolley-pole. The part 5 being rigidly connected to the trolley-pole proper and the trolley-fork 1 being movably connected thereto in the sense that it is capable of some vertical movement on the rod 3, which is rigidly attached to the trolley-pole 2, and the degree of the movement of said trolley-head being limited by the compression of the spring 12 against the nut 9 when a left-hand curve of the trolley-wire is being passed, the tendency of the trolley-fork will naturally be to accommodate itself to the position of the wire, and in so straining itself into an adjusted position with relation to the trolley-wire the arms of the fork will turn the part 7 of the fork to the right. This will cause the wedge-shaped portion 15 of the tubular portion 7 of the trolley-head to ride upward or turn upon the wedge-shaped portion 16 of the movable member 6, moving away from the wall 17 of the movable member 6 as it does so. The degree of upward movement of the portion 15 on the portion 16 is preferably limited to approximately one-fifth of a turn, and the degree of rotation of the trolley-fork in its accommodation of itself to the direction of the trolley-wire is limited at the same time and in the same manner, which is by reason of the fact that the vertical movement possible for the trolley-head is predetermined by the compressibility of the spring 12 and the amount of space between the shoulder 11 and the nut 9.

When a right-hand curve is being passed, the part 15 of the tubular portion 7 does not ride up on the incline 16 of the part 6; but, on the contrary, the part 14, which is the lowest portion of the cut on the tubular portion 7, fits down closely against the corresponding projecting part 14 of the interlocking cut on the upper part of the movable member 6, and the movable member 6 becomes thereby immovable rotatively relative to the trolley-head. The movable member, however, as well as the trolley-head, turns upon the rod 3, and the part 18 rides upward on the part 19 of the cut tubular end portion 5 of the trolley-pole proper. This movement is limited to one-fifth of a turn in like manner and for the same reasons as when the part 15 rides upward on the part 16, as above described. In either case, since the straight portion of the wire is rigid, the action of the wire on the trolley-wheel naturally and quickly returns the trolley-fork to its normal position, and this in turn returns the parts 5, 6, and 7 to the relative position substantially indicated in Fig. 2. If for any reason the parts should not be returned to their normal position in the manner described, the force of the spring 12, releasing itself from the compression caused by the upward movement of the trolley-head, will insure the prompt return of all the parts to their ordinary position as soon as the reason for the adjustment of the fork to a curve in the wire is at an end.

20 is a ring which fits in a groove around the upper portion of the trolley-pole proper and is for the purpose of holding the trolley-rope.

In Figs. 9 and 10 of the drawings I have illustrated an alternative form of construction which in the principle of operation bears much resemblance to that above described and which so far as the arrangement of the rod 3, spring 12, nut 9, and shoulder 11 is concerned depends upon the same arrangement of parts. In this construction, however, I omit parts 5, 6, and 7 and substitute in lieu thereof a tubular portion 21 at the base of the trolley-head, having in both its sides a portion cut out extending entirely through the walls of the tubular portion of a triangular or wedge shaped form or in the shape of a sugar-loaf, said triangular portion being indicated by the numeral 22. A pin 23, rigidly connected to the rod 3, runs clear through the tubular portion 21 from one side to the other, being located within the triangular cuts 22. When the trolley-head turns in rounding a right-hand curve, the pin 23 will slide downwardly upon the side of the triangle marked 24, and when the trolley-fork is passing around a left-hand curve the pin 23 will move downwardly, bearing against the opposite side of the triangle marked 25. The parts are returned to their normal position in this construction as above described with relation to the first-described form.

It is obvious that many other minor changes in the form and arrangement of the several parts may be made without departing from the nature and spirit of my invention.

Having thus described my said invention, what I claim, and desire to secure by Letters Patent, is—

1. In a trolley-pole, the combination of a trolley-fork having a tubular portion, a trolley-pole proper having a tubular portion, both said tubular portions having wedge-shaped cuts in their walls, a movable member located between said tubular portions, and having on its upper and lower edges corresponding cuts interlocking with the cuts on said tubular portions substantially as described.

2. In a trolley-pole the combination of a trolley-pole proper, having a tubular portion, a rod passing through said tubular portion, and rigidly connected to the trolley-pole proper, wedge-shaped cuts on the upper edges of said tubular portion, a trolley-fork having a tubular portion, said rod being extended through the tubular portion of said trolley-fork, means for holding the trolley-fork upon said rod, wedge-shaped cuts upon the lower edges of said tubular portion of the trolley-fork, and a movable member located between the trolley-fork and trolley-pole proper, having wedge-shaped cuts upon both its upper and lower edges, adapted to fit into like cuts on the trolley-pole proper and trolley-fork, substantially as described.

3. In a trolley-pole, the combination of the trolley-pole proper, a rod rigidly attached thereto, wedge-shaped cuts upon the upper end of the trolley-pole proper, a movable member encircling said rod, having wedge-shaped cuts upon both its upper and lower surface, a trolley-fork, the base portion of which encircles said rod, and having upon its lower surface wedge-shaped cuts which fit into those on the movable member, means for holding said trolley-fork upon said rod, a shoulder within the trolley-fork, and a spring located between said shoulder and means for retaining the fork upon the rod, substantially as described.

In testimony whereof I have hereunto attached my signature, in the presence of two witnesses, this 28th day of March, 1902.

THEODORE C. BUDER.

Witnesses:
MAUD LETCHER,
HUGH K. WAGNER.